United States Patent
Fliger et al.

(10) Patent No.: US 11,092,882 B2
(45) Date of Patent: Aug. 17, 2021

(54) PHOTOGRAPHIC AND VIDEO EQUIPMENT BRACKET WITH DEPLOYABLE ATTACHMENT POINT

(71) Applicants: David Fliger, Brooklyn Park, MN (US); Lynn Fliger, Brooklyn Park, MN (US)

(72) Inventors: David Fliger, Brooklyn Park, MN (US); Lynn Fliger, Brooklyn Park, MN (US)

( * ) Notice: Subject to any disclaimer, the term of this patent is extended or adjusted under 35 U.S.C. 154(b) by 0 days.

(21) Appl. No.: 16/159,034

(22) Filed: Oct. 12, 2018

(65) Prior Publication Data

US 2019/0113827 A1   Apr. 18, 2019

Related U.S. Application Data

(60) Provisional application No. 62/572,082, filed on Oct. 13, 2017.

(51) Int. Cl.
*G03B 17/56*   (2021.01)
*F16M 11/04*   (2006.01)

(52) U.S. Cl.
CPC .......... *G03B 17/561* (2013.01); *F16M 11/04* (2013.01); *G03B 17/563* (2013.01)

(58) Field of Classification Search
CPC ..... F16M 11/04; G03B 17/561; G03B 17/563
See application file for complete search history.

(56) References Cited

U.S. PATENT DOCUMENTS

| | | | |
|---|---|---|---|
| 8,699,134 B2 * | 4/2014 | Shen | G02B 23/165 359/429 |
| 8,746,994 B2 * | 6/2014 | Hasimoto | F16M 11/046 348/36 |
| 8,774,618 B1 * | 7/2014 | Muzila | F16M 11/10 396/198 |
| 9,052,574 B1 * | 6/2015 | Johnson, Sr. | G03B 17/561 |
| 9,097,962 B2 * | 8/2015 | Johnson, Sr. | G03B 17/561 |
| 9,280,039 B2 | 3/2016 | Johnson | |
| 9,298,067 B2 | 3/2016 | Johnson | |
| 9,298,068 B2 | 3/2016 | Johnson | |
| 9,298,069 B2 | 3/2016 | Johnson | |
| 9,372,383 B2 | 6/2016 | Johnson | |
| 9,568,810 B2 | 2/2017 | Johnson | |
| 9,690,171 B2 | 6/2017 | Johnson | |
| 9,989,836 B1 * | 6/2018 | Riddel | G03B 17/561 |
| 2014/0093314 A1 * | 4/2014 | Kessler | F16M 11/048 403/361 |
| 2014/0158845 A1 * | 6/2014 | Fliger | F16M 11/041 248/309.1 |

* cited by examiner

*Primary Examiner* — Noam Reisner
(74) *Attorney, Agent, or Firm* — Gutwein Law; Greg N. Geiser (57) ABSTRACT

A mounting bracket adapted for securing to photographic and video equipment. The bracket having a general L-shape formed from a coupling of a base portion and a bracket portion. The bracket portion and base portion coupling is generally movable in a slidable and hinged configuration, wherein the bracket portion is adapted to move and tilt outward from attached equipment relative to the base portion. The base portion including a deployable attachment member that is generally movable from a retained position to a deployed position.

17 Claims, 12 Drawing Sheets

FIG. 12

# PHOTOGRAPHIC AND VIDEO EQUIPMENT BRACKET WITH DEPLOYABLE ATTACHMENT POINT

CROSS REFERENCE TO RELATED APPLICATIONS

This application claims priority to U.S. Provisional Patent Application No. 62/572,082 filed 15 Oct. 2017 to the above named inventors, and is herein incorporated by reference in their entirety.

FEDERALLY SPONSORED RESEARCH OR DEVELOPMENT

Not Applicable

SEQUENCE LISTING, A TABLE, OR A COMPUTER PROGRAM

Not Applicable

FIELD OF THE INVENTION

This invention relates generally to an L-shaped mounting bracket or plate removably affixed to and configured to secure photographic and video equipment to a stabilizing element along two axes.

BACKGROUND

Photographic and video equipment are often mounted on stabilizing equipment, such as a tripod, through the use of a bracket or plate member. When stabilized on both axis of a camera (portrait and landscape), a generally L-shaped bracket is utilized to secure two sides of a camera body. Currently, within the prior art there exists a mounting bracket, generally referred to as a L-plate. This L-plate is positioned as a mounting plate that is affixed to a body portion of a photographic device or a video device and resembling an "L-shape" allowing a user to affix the photographic or video device to a stabilizing element along a horizontal axis of the camera body and parallel to a bottom portion of the body or along a vertical axis of camera body and parallel to a side portion of the body perpendicular to the bottom portion. This allows for placement of the photographic or video device in a position to capture images in a portrait or landscape configuration.

Accordingly, the L-plate or L bracket as it is referred within this specification is often affixed to the lower portion of the photo device body portion with a base portion receiving a fastener engaged in a standard threaded socket within the body portion and having a bracket portion affixed to the base portion that extends perpendicular to the base portion and is positioned on a side of the photo device body portion.

Typically, the L-style plates and brackets found within the prior art are constructed for a specific photo and video device body portion and formed from a single shaped material or provided from a base portion and bracket portion that is affixed to the base portion in a rigid assembly.

While these tradition L-style brackets are useful, there exists a need for an improved the L-style bracket that allows for more universal use, provides for adjustability, and generally allows for access to various ports, doors, and functional elements of the photographic or video device that may be otherwise obscured, blocked, or restricted by the installation of the L-shaped bracket. Preferably, this L-bracket includes a deployable attachment member that is movable from a retained position to a deployed position and adapted for securing to a strap member within this deployed position.

BRIEF SUMMARY OF THE INVENTION

In one aspect, this disclosure is related to an L-shaped mounting bracket that is configured for securing to a photographic or video device and having a deployable attachment member.

In another aspect, this disclosure is related to an L-shaped mounting bracket configured for securing to a photographic or video device and having an L-shaped mounting bracket with a base portion and a bracket portion aligned perpendicular to the base portion and hingedly and slidably received on the base portion to allow for access to a side portion of the photographic or video device after the base portion has been installed.

BRIEF DESCRIPTION OF THE DRAWINGS

The accompanying drawings are included to provide a further understanding of the present invention and are incorporated in and constitute a part of this specification. The drawings illustrate exemplary embodiments of the present invention and together with the description serve to further explain the principles of the invention. Other aspects of the invention and the advantages of the invention will be better appreciated as they become better understood by reference to the Detailed Description when considered in conjunction with accompanying drawings, and wherein:

FIG. 10 8 is a front side view of the device installed on a camera body in an extended and hinged position in operation, according to the present invention;

FIG. 9 is a front side view of the device in an extended and hinged position, according to the present invention;

DETAILED DESCRIPTION OF THE INVENTION

The following detailed description includes references to the accompanying drawing, which forms a part of the detailed description. The drawing shows, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense.

Before the present invention is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the disclosure made herein.

Unless otherwise indicated, the words and phrases presented in this document have their ordinary meanings to one of skill in the art. Such ordinary meanings can be obtained by reference to their use in the art and by reference to general and scientific dictionaries.

References in the specification to "one embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following explanations of certain terms are meant to be illustrative rather than exhaustive. These terms have their ordinary meanings given by usage in the art and in addition include the following explanations.

As used herein, the term "and/or" refers to any one of the items, any combination of the items, or all of the items with which this term is associated.

As used herein, the singular forms "a," "an," and "the" include plural reference unless the context clearly dictates otherwise.

As used herein, the terms "include," "for example," "such as," and the like are used illustratively and are not intended to limit the present invention.

As used herein, the terms "preferred" and "preferably" refer to embodiments of the invention that may afford certain benefits, under certain circumstances. However, other embodiments may also be preferred, under the same or other circumstances.

Furthermore, the recitation of one or more preferred embodiments does not imply that other embodiments are not useful, and is not intended to exclude other embodiments from the scope of the invention.

As used herein, the terms "front," "back," "rear," "upper," "lower," "right," and "left" in this description are merely used to identify the various elements as they are oriented in the FIGS., with "front," "back," and "rear" being relative to the apparatus. These terms are not meant to limit the elements that they describe, as the various elements may be oriented differently in various applications.

As used herein, the term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

Referring now to FIGS. 1-12 of the photographic and video equipment 1 bracket with deployable attachment point of the present disclosure, generally referred to as device 10. The device 10 is configured as L-style bracket, wherein the device 10 has a base portion 100 and a bracket portion 200 generally positioned perpendicular to the base portion 100 in an engaged position resembling an L-shape. Accordingly, reference to the term L-style provides a device assembly with two portions aligned in a position where a first portion has a first axis and a second portion has a second axis that is positioned perpendicular to the first axis resembling an L-shape. Within this specification a device of this type is referred to interchangeably as an L-style bracket, L-plate, L-shaped bracket, or L-bracket.

The device 10 is configured in an assembly with the base portion 100 and the bracket portion 200 slidably and hinged coupled in an assembly to allow the bracket 200 to extend a direction outward and parallel from a first end wall 101 of the base portion 100 and angularly rotationally downward and perpendicular from a top side 102 of the base portion 100 along an axis. The base portion 100 generally configured for receipt on a body portion of the photographic and video equipment 1 through the use of a threaded fastener 130 received within a threaded socket typically found on the bottom side of photographic and video equipment 1.

Preferably, the fastener 130 is received within a channel 131 on a bottom side 103 of the base portion 100. The bottom side 103 opposite the top side 102 defining a planar body with a pair of opposed sidewalls 104, 105 and the first end wall 101 and a second end wall 106 opposed the first end wall 101, wherein the distance between the first end wall 101 and second wall 106 defines a length of the base portion 100. The channel 131 forming an aperture between the bottom side 103 and top side 102 wherein the fastener 130 is retained within the channel 131. To facilitate the retaining of the fastener 130 within the channel 131, the channel 131 may include a threaded key hole having a diameter configured to receive a cooperating fastener 130 with a thread diameter corresponding to the diameter of the threaded key hole and having a body or shank portion adjacent to a head of the fastener 130 and prior to the threads, wherein the shank portion has a diameter and length substantially similar to the channel 131. Accordingly, the fastener 130 can be placed within the key hole and slid within the channel 131 for alignment with the threaded socket of the photographic and video equipment the device 10 is placed upon. This channel 131 and fastener 130 coupling of the base portion 100 allows for installation of the device 10 on several sizes of photographic and video equipment 1.

The base portion 100 includes an attachment loop 300 on the bottom side 103 movable via hinged rotation along a fixed axis between a deployed position (generally perpendicular to the length of the base portion 100) and a retracted position (generally positioned parallel to the length of the base portion 100). The attachment loop 300 hinged receipt within a recess 132 aligned with the channel 131 with the recess 132 sized to accommodate the attachment loop 300 in a flush position relative to the planar surface of the bottom side 103 when in the retracted position. The attachment loop 300 having an aperture 301 to receive a fastener, such as a clip with a strap, when in the deployed position. The positioning of the attachment loop 300 within the recess 132 and alignment with the channel 131 is configured to enable a user access to the fastener 130 through the aperture 301 when the attachment loop 300 is in the retracted position.

The bottom side 103 having at least one mortise 134 adjacent to the first end 101 and a tab 135. The at least one mortise 134 configured for the receipt of a cooperating tenon 2101, 2111 on the bracket portion 200 when in the engaged position. In the preferred embodiment of the present invention, the bottom side 103 includes a pair of mortises 134 positioned on sides of the tab 135 to form a more secure connection when the bracket portion 200 is received in the engaged position in coupling with the base portion 100.

The tab 135 extending from the first end wall 101 opposite the second end wall 106 along the length of the base portion 100 and configured with the corresponding structure to allow the hinged and slidable movement of the base portion 100 and the bracket portion 200 coupling. Accordingly, the tab 135 having a fixed end 1351 adjacent to the first end wall 101 and a free end 1352 opposite the fixed end 1351 and defining the length of the tab 135. The tab 135 having an aperture 1353 generally elongate and extending a substantial length of the tab 135 and sized to receive a hinge pin 213 of the bracket portion 200 in a slidable engagement. The free end 1352 including a tenon 1352a shaped for receipt within a corresponding mortise 212 of the bracket portion 200 when in the engaged position in coupling with the bracket portion 200.

The base portion 100 opposed sidewalls 104, 105 each including a groove 140, 150 along the length. Each groove 140, 150 configured with a size selected for receipt within a clamping member, such as a stabilizing element. In the preferred embodiment, each groove 140, 150 is a dovetail-shaped groove shaped to allow for securing within an ARCA-Swiss styled clamp.

Preferably, the base portion 100 further includes an adjustable bar 120 configured to aid in securing equipment on the base portion 100 top side 102 and preventing rotation of the photographic and video equipment when secured upon the base portion 100. The adjustable bar 120 positioned adjacent to an edge of the sidewalls 104, 105 and adjustable a width of the base portion extending generally between the opposed sidewalls 104, 105 of the device 10. The adjustable bar 120 and having a projection 121 extending upward from the top side 102 of the base portion opposite the bottom side 103. The adjustable bar 120 configured for movement within a notch 122 of the top side 102, wherein the adjustable bar 120 is generally positioned flush with the surface of the top side 102 perpendicular to the base portion 100 length. Preferably, the adjustable bar 120 includes a plurality of apertures 123 sized for the receipt of a fastener to secure the position of the adjustable bar 120. Accordingly, the bottom side 103 including a groove 133 aligned with the notch 122 along the bottom side 103 and sized to receive the fastener for securing the adjustable bar 120.

The top side 102 of the device 10 base portion 100 including gripping surface 124 generally comprised of a compressible and resilient material, such as, but not limited to, a rubber, a foam, a foam rubber, or other similar material. Preferably, the top side includes a pair of gripping surfaces 124 extending the length of the top side and positioned on both sides of the channel 131.

The bracket portion 200 having a first end 201 slidably and hingedly coupled to the first end wall 101 of the base portion 100. The first end 201 opposite a second end 202 and extending perpendicular to a length between the first end 201 and second end 202 of the bracket portion 200, wherein the first end 201 generally is positioned at a right angle relative to the length of the bracket portion 200. The first end 201 bifurcated with a pair of legs 210, 211 sized and positioned to straddle the tab 135 and configured with a means for interlocking with the base portion 100 in a generally perpendicular position when engaged.

Preferably this locking means is a mortise and tenon configuration. Accordingly, each leg of the pair of legs 210, 211 includes the tenon 2101, 2111 sized and shaped for engagement with the at least one mortise 134 of the base portion 100 and the mortise 212 positioned between the pair of legs 210, 211 for engaging the tenon 1352a of the free end 1352 of the base portion 100 in an engaged position. Each leg of the pair of legs 210, 211 including an aperture 2102, 2112 sized to receive the hinge pin 213. The hinge pin 213 received within the apertures 2102, 2112 of the legs 210, 211 and aperture 1353 of the tab 135 to complete the slidable and hinged assembly. The hinge pin 213 preferably a threaded fastener, wherein the pin can be tightened and loosened within the apertures 2102, 2112 for securing the hinged connection of the bracket portion 200 and base portion 100.

The first end 201 and the second end 202 in communication with a pair of opposed sidewalls 203, 204 and a first side 205 opposed a second side 206 to generally define the perimeter of the bracket portion 200 surrounding a cavity 207. The cavity 207 extending between the first side 205 and the second side 206 and configured to allow for the ingress and egress of peripheral attachments to the of photographic and video equipment.

The bracket portion 200 opposed sidewalls 203, 204 each including a groove 230, 240 along the length. Each groove 230, 240 configured with a size selected for receipt within a clamping member, such as a stabilizing element. In the preferred embodiment, each groove 230, 240 is a dovetail-shaped groove shaped to allow for securing within an ARCA-Swiss styled clamp. Accordingly, the device 10 can be received within the clamping member along the axis of the bracket portion 200 length and the axis of base portion 100 length to generally allow for use in a portrait and landscape configuration.

In the preferred embodiment of the present invention, one side wall 203, 204 of the pair of sidewalls 203, 204 includes a means to retain a tool 400, such as a hex style wrench. Preferably, the retaining means is a recess 231 within a sidewall 203 sized and shaped for the receipt of the tool 400 in an unobtrusive position. The securing of the tool within the recess may be further aided through the use of a magnet 401 for coupling the tool 400 within the recess 231 and to the sidewall 230. Preferably, the tool 400 is selected for coupling with the several fasteners of the device 10, wherein the tool 400 is quickly utilized and stored for assembly and fit of the features of the device 10.

Preferably, the first side 205 includes a contact point 250 adjacent to the second end 202 and extending outward from the first side 205 opposite the second side 206 to generally engage the body of the of photographic and video equipment the device 10 is placed upon for support in a portrait orientation.

Figure 1:
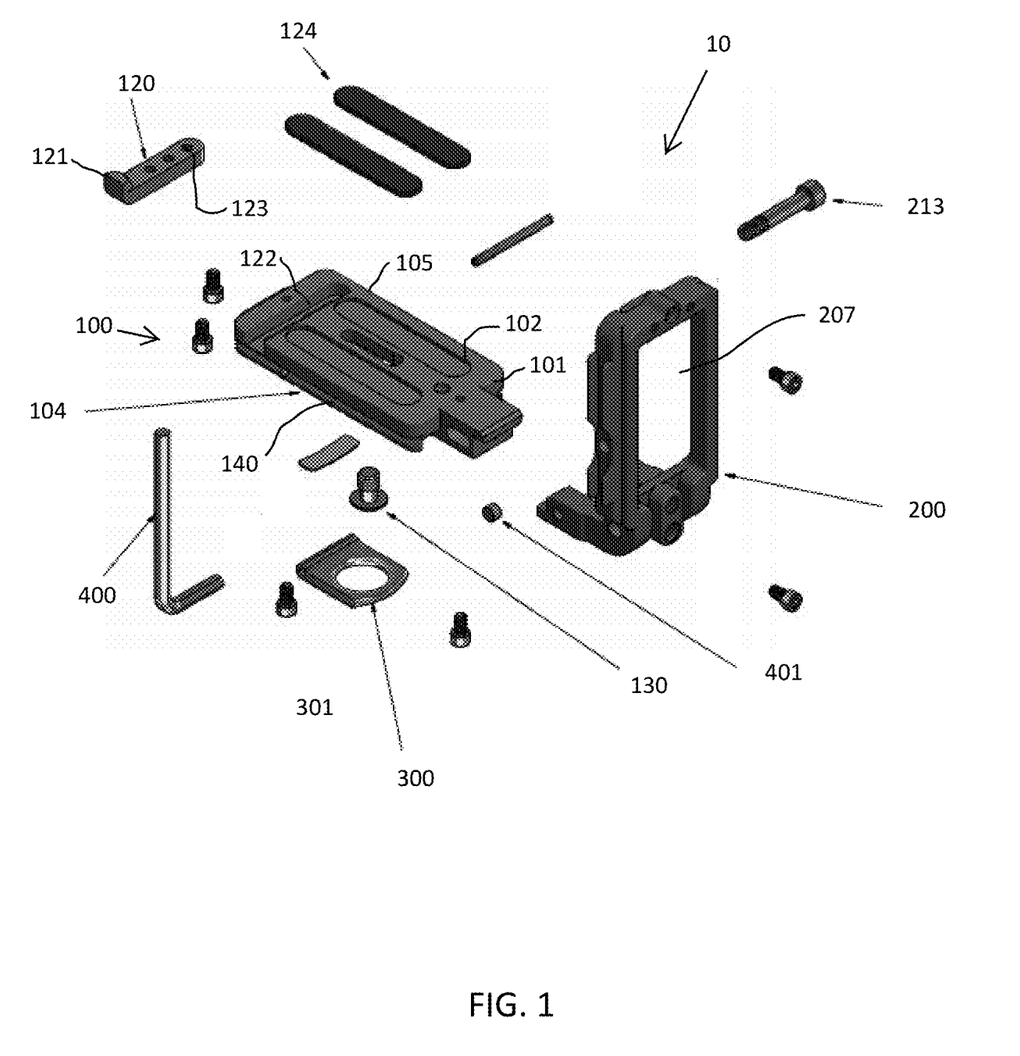
FIG. 1 is an isometric exploded view of the device assembly, according to the present invention.
Figure 2:
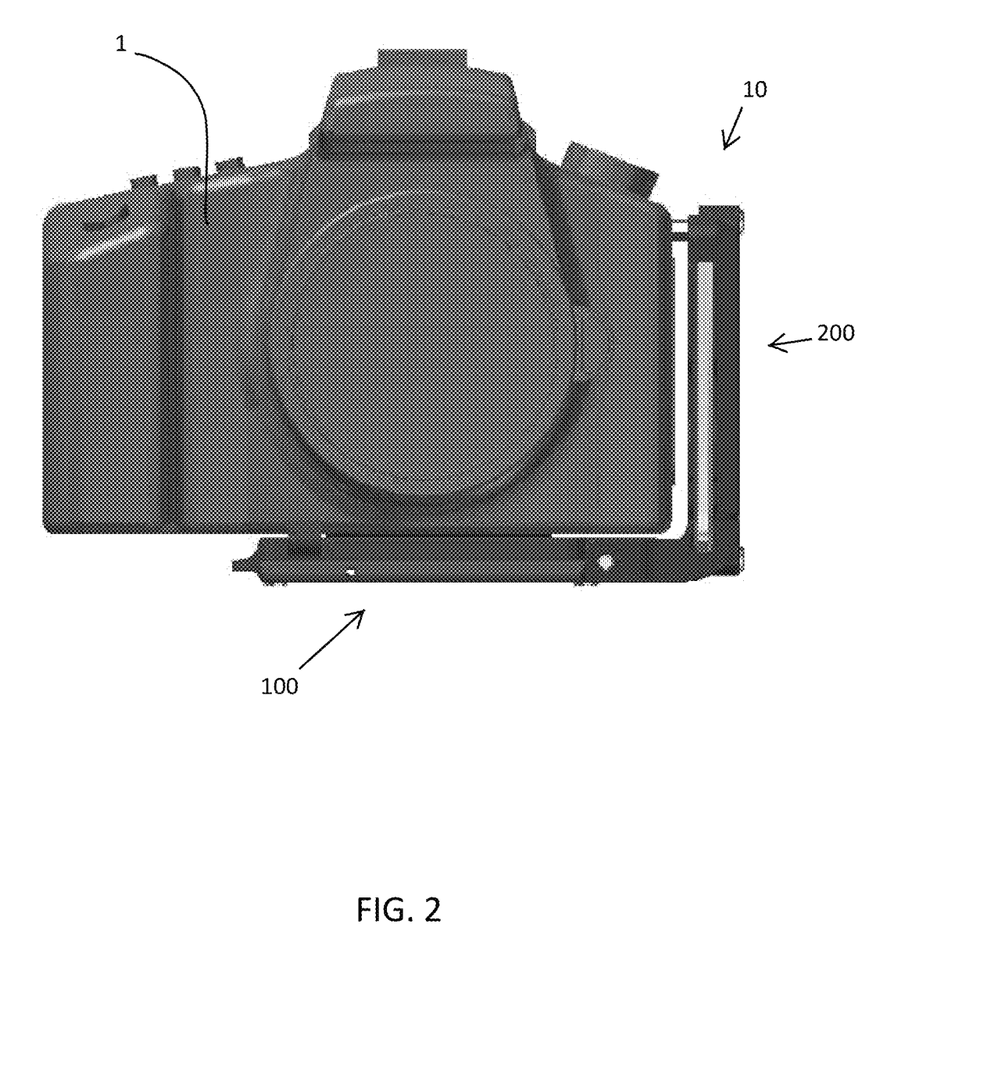
FIG. 2 is a front side view of the device installed on a camera body, according to the present invention.
Figure 3:
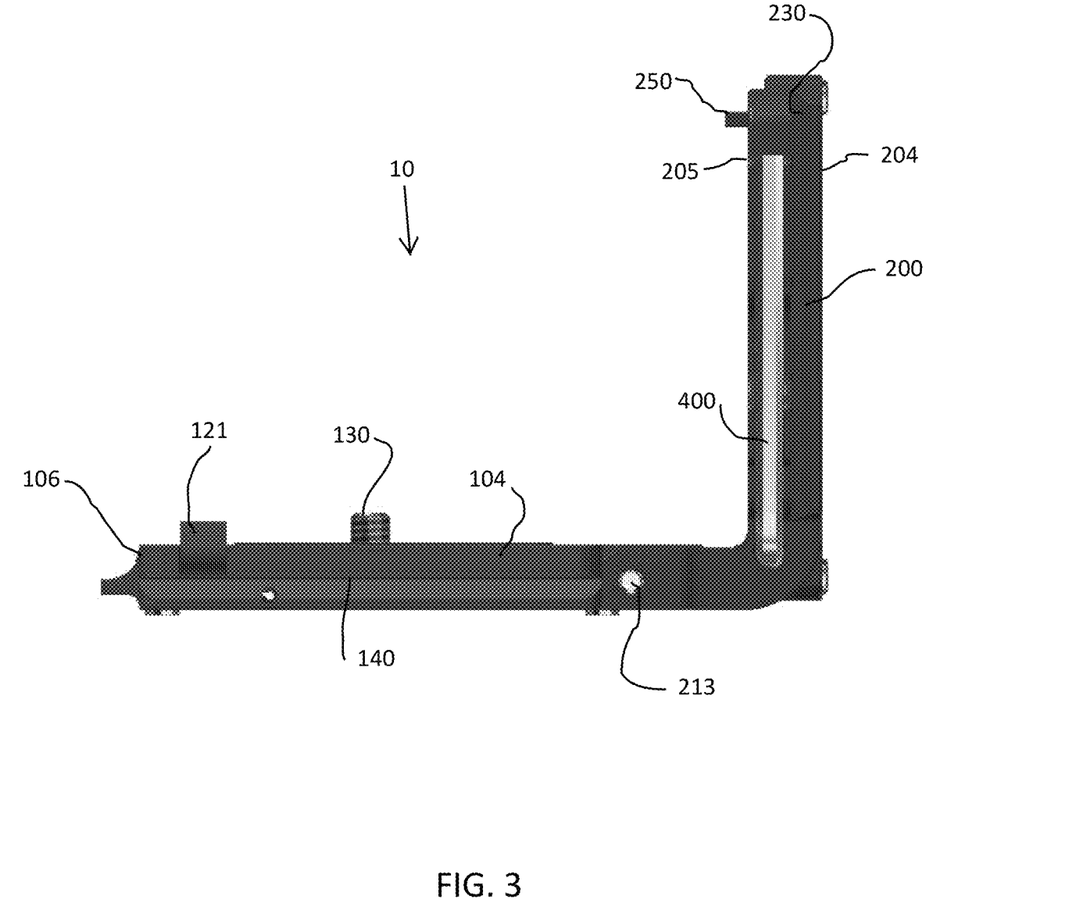
FIG. 3 is a front view of the device, according to the present invention.
Figure 4:
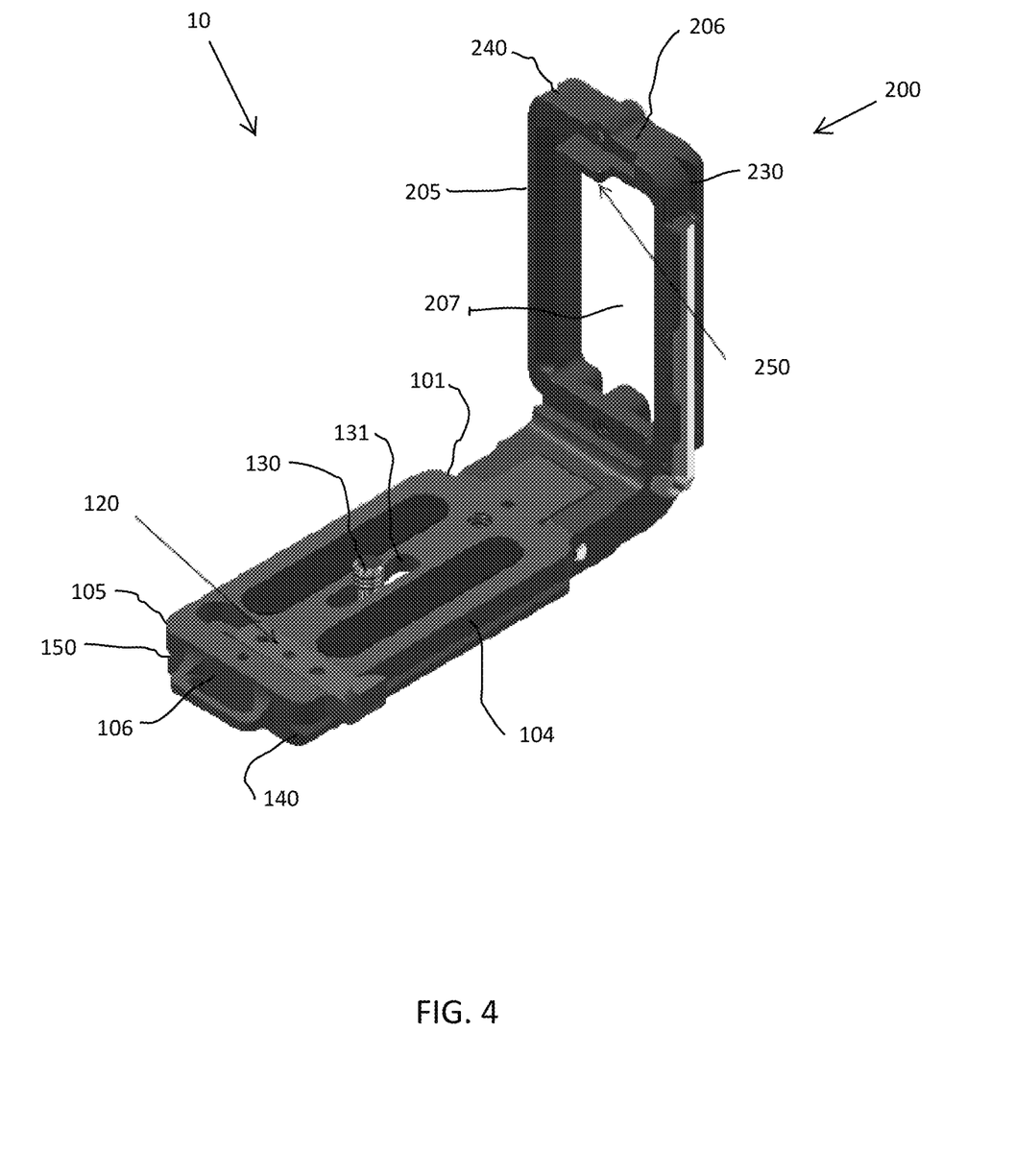
FIG. 4 is a top side isometric view of the device, according to the present invention.
Figure 5:
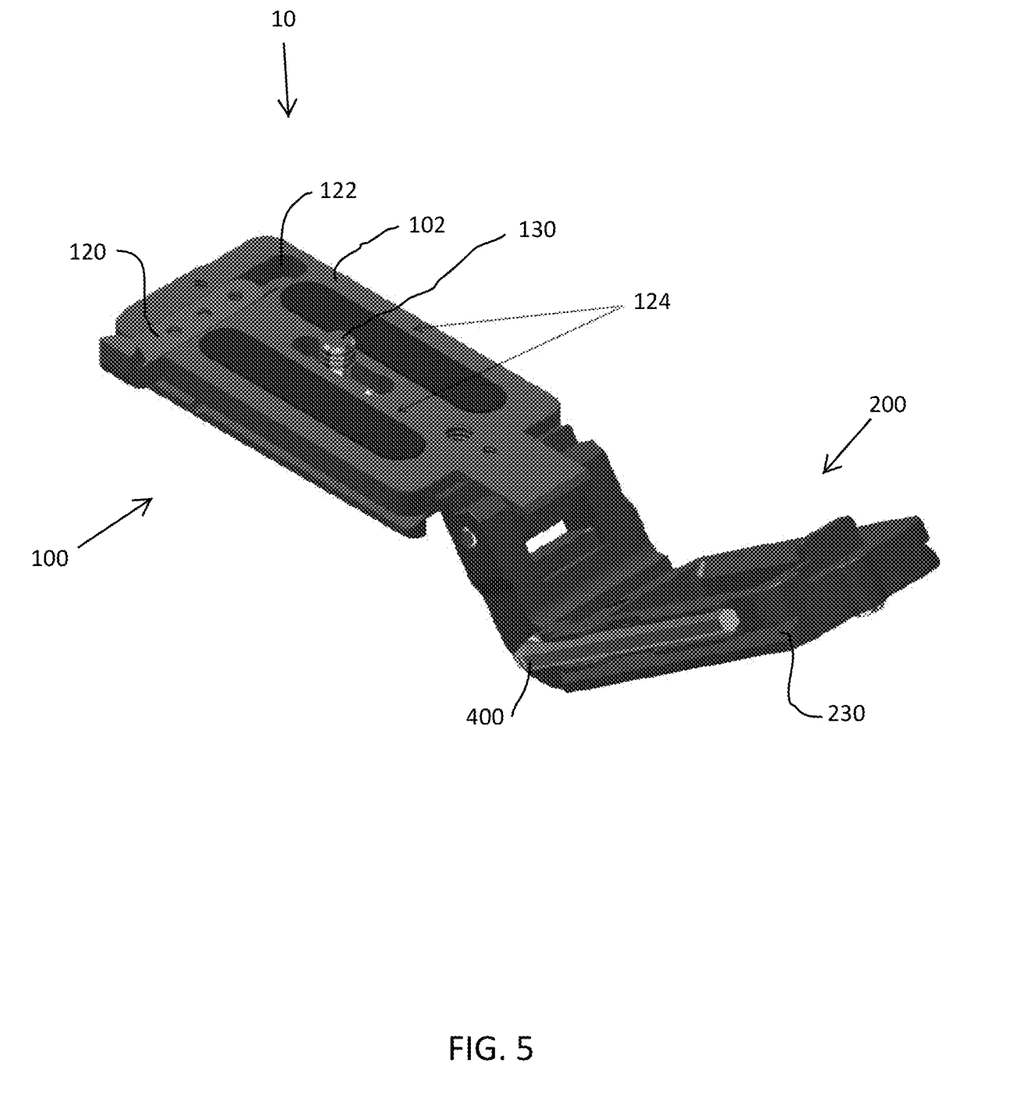
FIG. 5 is an isometric top side view of the device in an extended and hinged position, according to the present invention.
Figure 6:
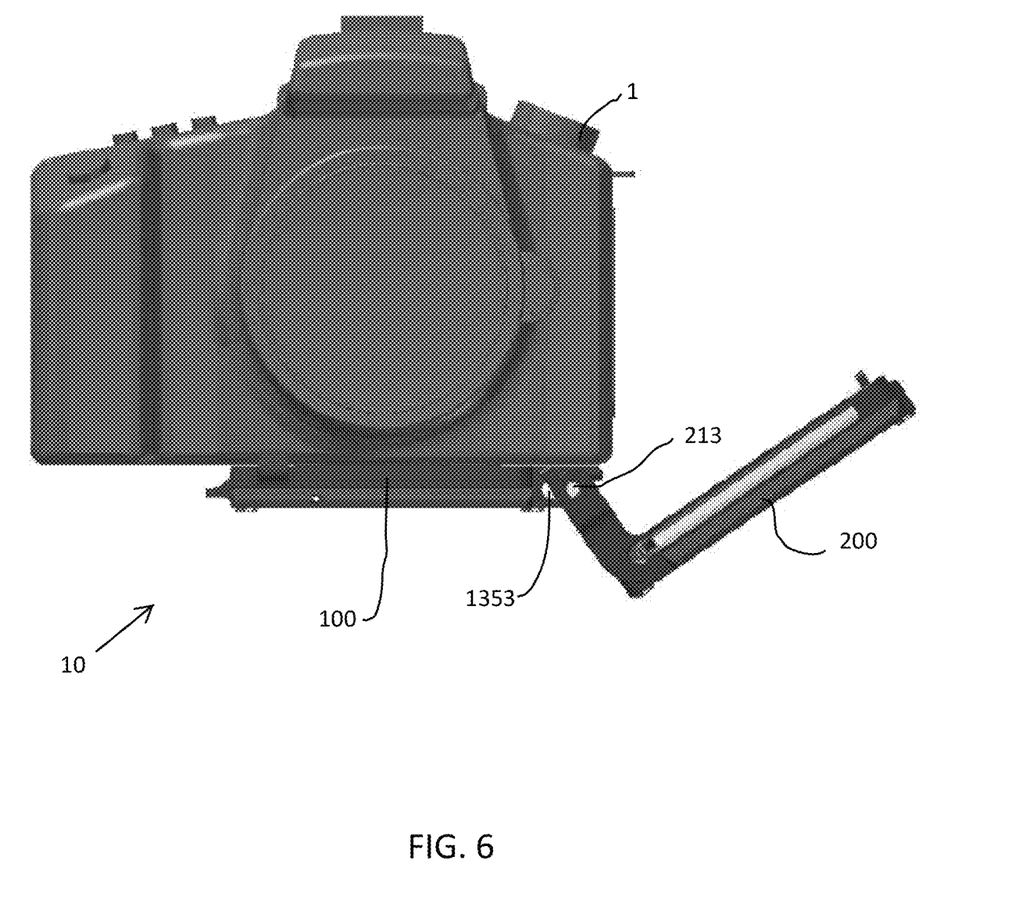
FIG. 6 is a front side view of the device installed on a camera body in an extended and hinged position in operation, according to the present invention.
Figure 7:
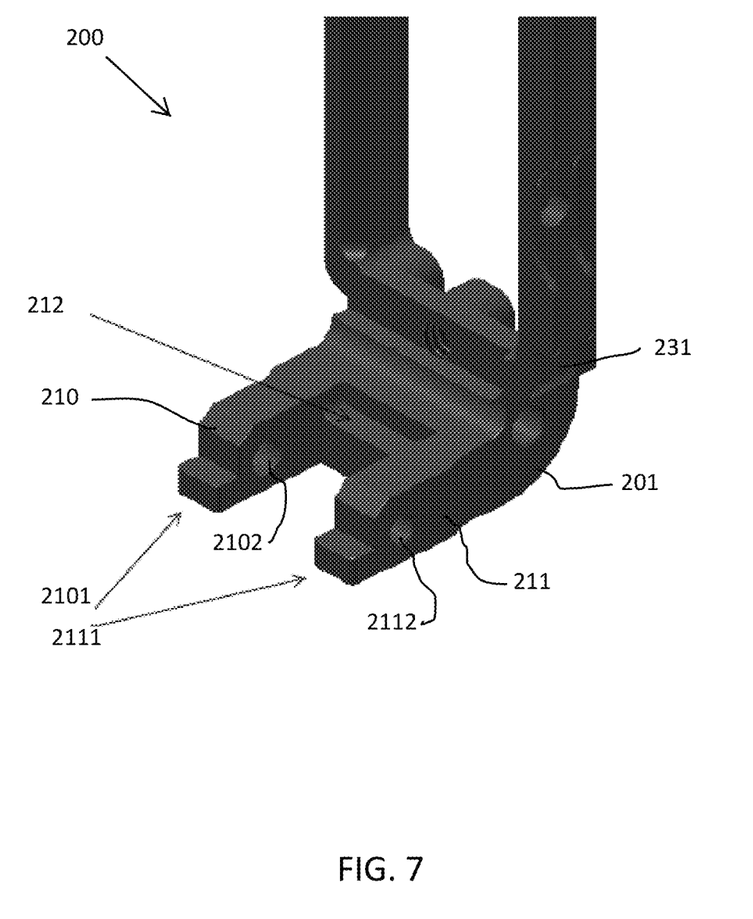
FIG. 7 is a close up view of a portion of the bracket portion of the device, according to the present invention.
Figure 8:
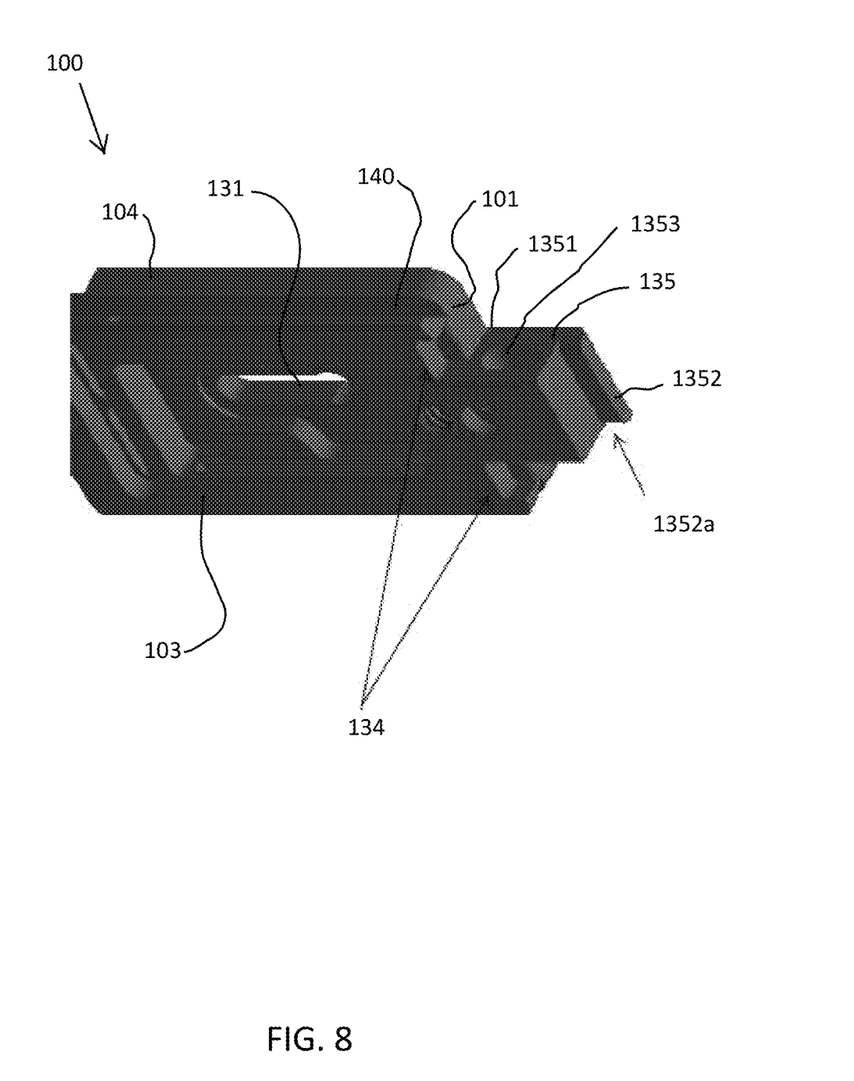
FIG. 8 is a close up view of a portion of the base portion of the device, according to the present invention.
Figure 9:
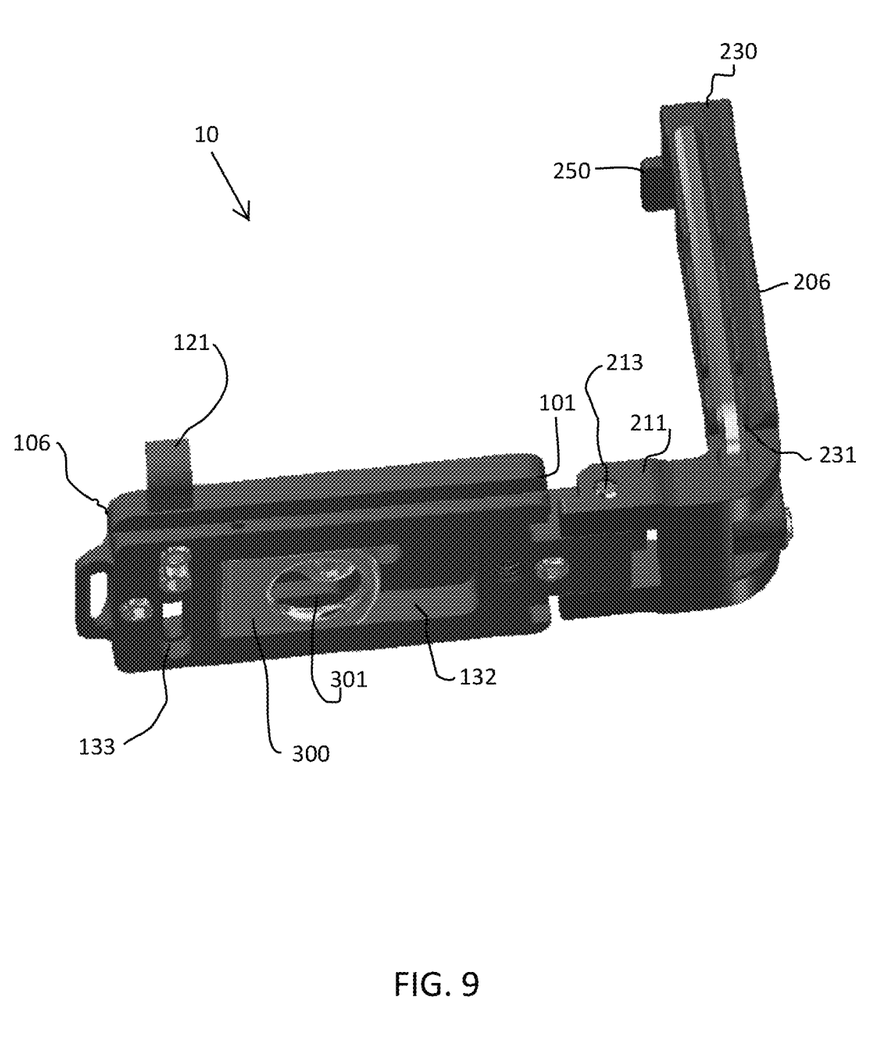
FIG. 9 is an isometric view of the device in an extended position, according to the present invention.
Figure 10:
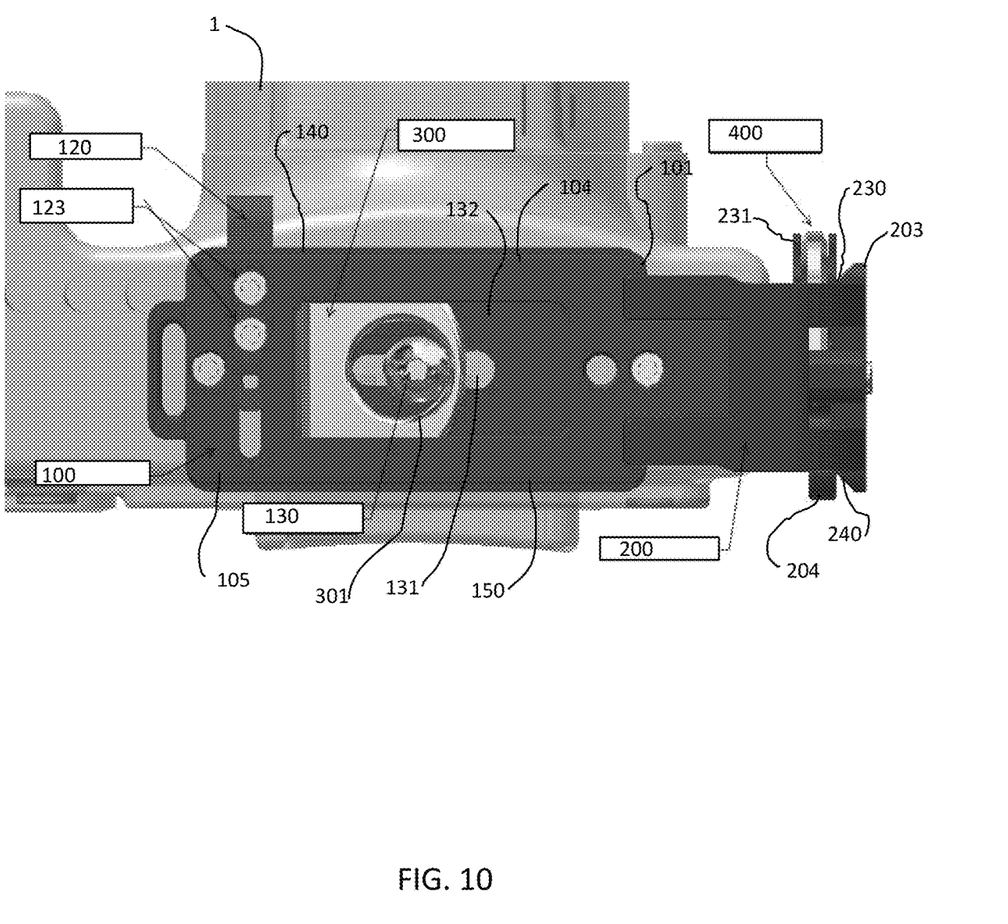
FIG. 10 is a bottom side view of the device installed on a camera body, according to the present invention.
Figure 11:
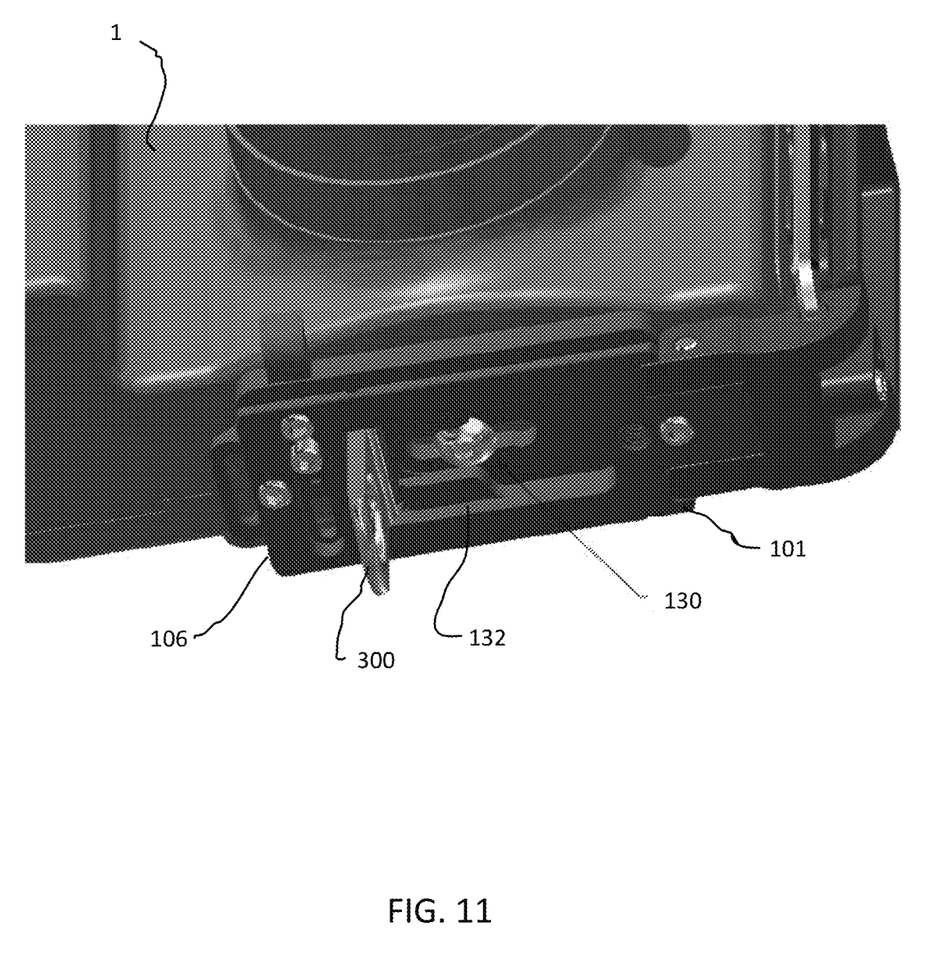
FIG. 11 is an isometric front and bottom side view of the device installed on a camera body with the attachment loop in a deployed position, according to the present invention.
Figure 12:
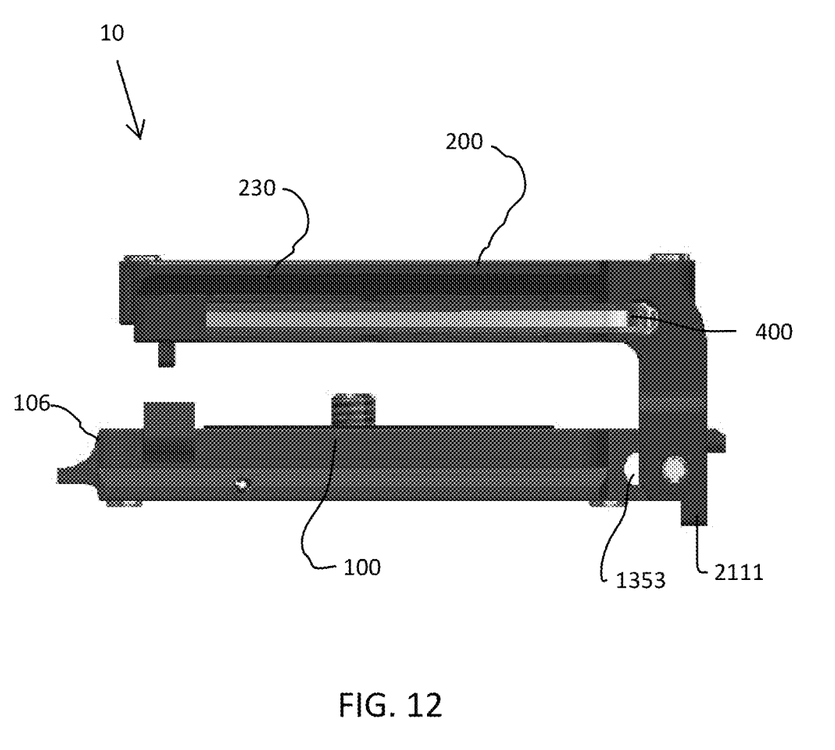
FIG. 12 is a front side view of the device in a storage configuration, according to the present invention.

According to the assembly of the device 10, the base portion 100 and bracket portion 200 may be moved to a folded position for storage, wherein the bracket portion 200 and the base portion 100 are positioned with their lengths parallel to each other (FIG. 12).

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) but that the invention will include all embodiments falling with the scope of the appended claims.

What is claimed is:

1. An L-bracket for removable attachment to a threaded socket of photographic and video devices, the mounting bracket comprising:
    a base portion, the base portion having:
        a top side, the top side in communication with the device;
        a bottom side, the bottom side opposite the top side, wherein the bottom side includes a recess, the recess sized for the receipt of an attachment member, the attachment member having an aperture and hingedly coupled to the bottom side within the recess,
        wherein the attachment member is movable between a retained position and a deployed position;
        a first end portion;
        a second end portion, the second end portion opposite the first end portion;
        a pair of opposed sidewalls, the sidewalls connecting the top side, the bottom side, the first end, and the second end, the sidewalls each having a groove, each groove sized for receipt within a corresponding stabilizing element; and
        a fastener, the fastener sized for receipt within the threaded socket, wherein the fastener secures the mounting bracket to the device; and
    a bracket portion, the bracket portion hingedly and slidably received on the first end portion of the base portion and movable between an engaged position coupled to the base portion and a disengaged position, wherein, while the device is secured to the base with the fastener, the bracket portion is movable away from the base portion between the engaged position and the disengaged positon, such that a side of the photographic and video devices is accessible in the disengaged position, the bracket portion having:
        a second pair of opposed sidewalls, each sidewall of the second pair of opposed sidewalls having a groove, each groove sized for receipt within a corresponding stabilizing element, wherein the second pair of opposed sidewalls is positioned perpendicular to the first pair of opposed side walls in the engaged position.

2. The mounting L-bracket as in claim 1, wherein the top side includes a gripping surface.

3. The L-bracket as in claim 1, wherein the first end portion includes at least one mortise, the at least one mortise configured for receipt with a tenon on the bracket portion in the engaged position.

4. The L-bracket as in claim 1, wherein the top side includes a notch, the notch sized for the receipt of an adjustable bar, the adjustable bar movable perpendicular to a length of the base portion.

5. The L bracket as in claim 4, wherein the adjustable bar includes a lip, the lip extending upward from the top side opposite the bottom side.

6. The L-bracket as in claim 1, wherein the base portion pair opposed sidewall grooves extend a length of the base portion and the bracket portion second pair of opposed sidewall grooves extend a length of the bracket.

7. The L-bracket as in claim 1, wherein the bracket portion includes a recess, the recess configured for the receipt of a tool.

8. The L-bracket as in claim 7, wherein the recess includes a magnet, the magnet configured for coupling of the tool within the recess.

9. The L-bracket as in claim 8, wherein the tool is a hex wrench.

10. A L bracket for removable attachment to a threaded socket of a photographic or a video device, the mounting bracket comprising:
    a base portion, the base portion having:
        a top side, the top side in communication with the device;
        a bottom side, the bottom side opposite the top side, the bottom side having a recess, the recess sized for the receipt of an attachment member;
        the attachment member having an aperture and hingedly coupled to the bottom side within the recess, wherein the attachment member is movable between a retained position and a deployed position;
        a first end portion, the first end portion having a tab, the tab extending outward from the first end portion opposite a second end portion;
        the second end portion opposite the first end portion, the distance between the first end portion and the second end portion defining a length;
        a pair of opposed sidewalls, the sidewalls connecting the top side, the bottom side, the first end, and the second end, the sidewalls each having a groove, each groove extending the length and sized for receipt within a corresponding stabilizing element; and
        a fastener, the fastener sized for receipt within the threaded socket, wherein the fastener secures the mounting bracket to the device; and
    a bracket portion, the bracket portion hingedly and slidably received on the tab of the base portion and movable an angularly rotation downward and perpendicular between an engaged position coupled to the base portion and a disengaged position, wherein, while the device is secured to the base with the fastener, the bracket portion is movable away from the base portion between the engaged position and the disengaged positon, such that a side of the photographic or video device is accessible when the bracket portion is in the disengaged position, the bracket portion having:
        a second pair of opposed sidewalls, each sidewall of the second pair of opposed sidewalls having a groove, each groove sized for receipt within a corresponding stabilizing element, wherein the second pair of opposed sidewalls is positioned perpendicular to the first pair of opposed side walls in the engaged position.

11. The L-bracket as in claim 10, wherein the top side includes a gripping surface.

12. The L-bracket as in claim 11, wherein the first end portion includes at least one mortise, the at least one mortise configured for receipt with a tenon on the bracket portion in the engaged position.

13. The L-bracket as in claim 10, wherein the top side includes a notch, the notch sized for the receipt of an adjustable bar, the adjustable bar movable perpendicular to the length of the base portion.

14. The L-bracket as in claim 13, wherein the adjustable bar includes a lip, the lip extending upward from the top side opposite the bottom side.

15. The L-bracket as in claim 10, wherein the bracket portion includes a recess, the recess configured for the receipt of a tool.

16. The L-bracket as in claim 15, wherein the recess includes a magnet, the magnet configured for coupling of the tool within the recess.

17. The L-bracket as in claim 16, wherein the tool is a hex wrench.

* * * * *